Oct. 27, 1931.  E. E. METCALF  1,828,844
HARVESTER
Filed June 22, 1929    5 Sheets-Sheet 1
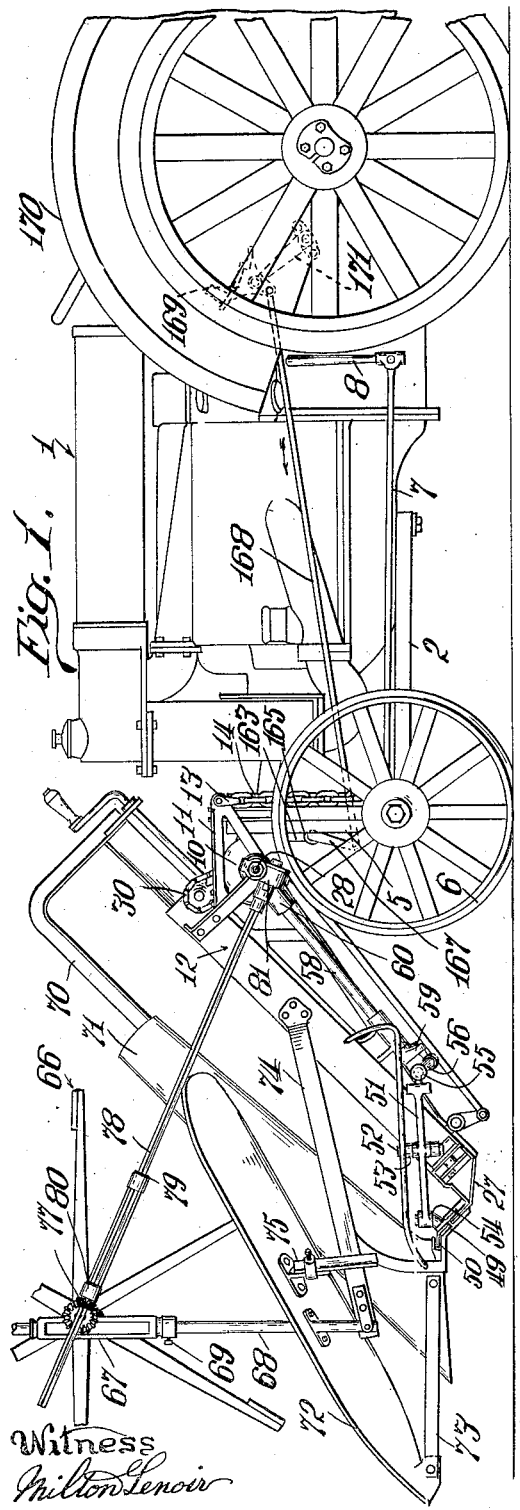
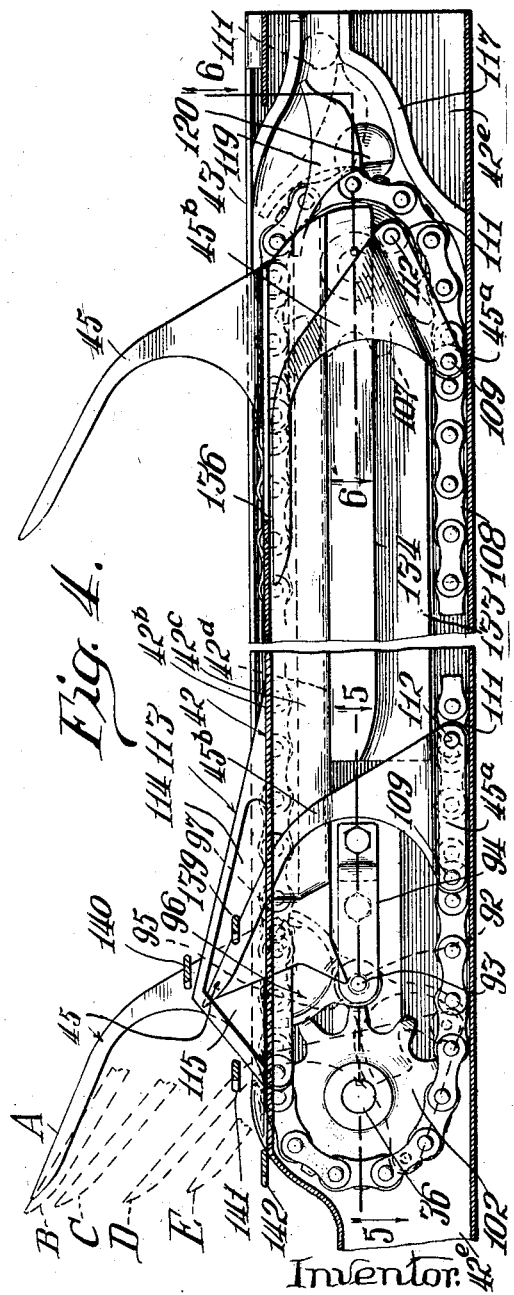
Inventor.
Edgar E. Metcalf
By Brown, Jackson, Boettcher & Dienner.
Attorneys.

Oct. 27, 1931.   E. E. METCALF   1,828,844
HARVESTER
Filed June 22, 1929   5 Sheets-Sheet 2

Witness
Milton Lenoir

Inventor
Edgar E. Metcalf
By Brown, Jackson, Boettcher & Dienner
Attorneys.

Oct. 27, 1931.  E. E. METCALF  1,828,844
HARVESTER
Filed June 22, 1929  5 Sheets-Sheet 3
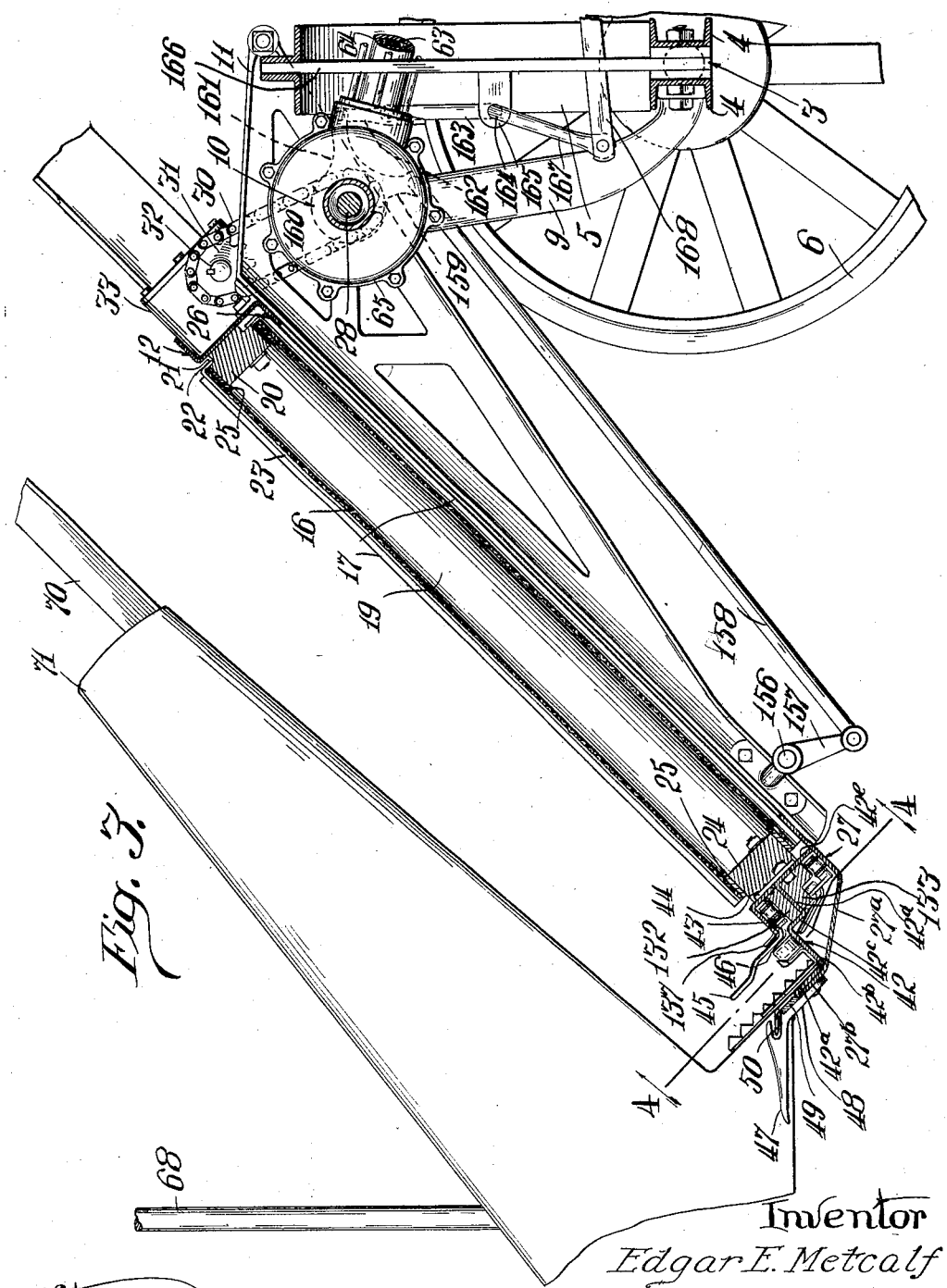
Inventor
Edgar E. Metcalf
By Brown, Jackson, Boettcher & Drenner
Attorneys
Witness
Milton Lenoir Oct. 27, 1931.  E. E. METCALF  1,828,844
HARVESTER
Filed June 22, 1929   5 Sheets-Sheet 4
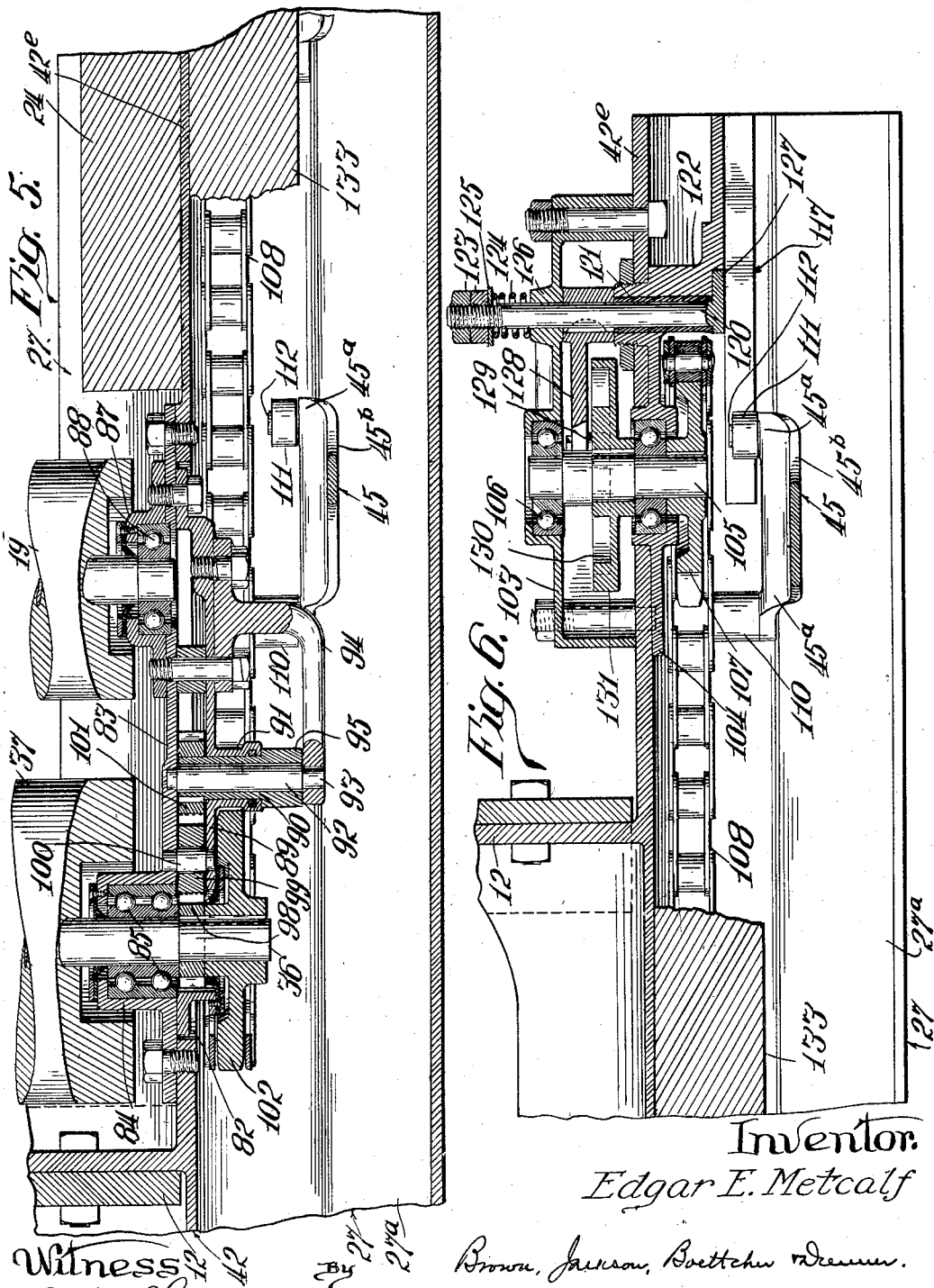
Inventor.
Edgar E. Metcalf

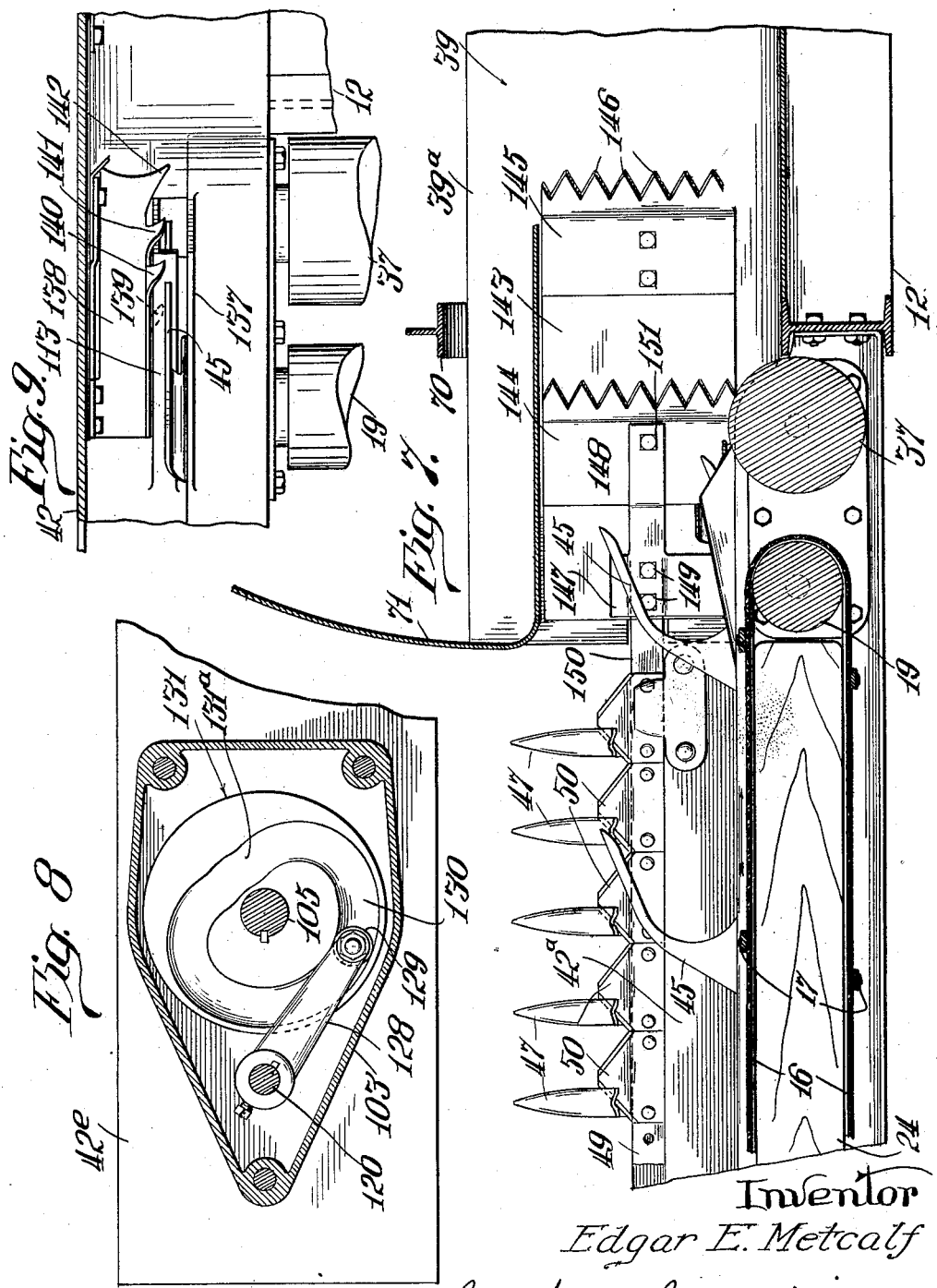

Patented Oct. 27, 1931

1,828,844

UNITED STATES PATENT OFFICE

EDGAR E. METCALF, OF MOVILLE, IOWA, ASSIGNOR TO DEERE & COMPANY, OF MOLINE, ILLINOIS, A CORPORATION OF ILLINOIS

HARVESTER

Application filed June 22, 1929. Serial No. 372,906.

This invention relates to harvesters, and more particularly to a harvesting machine in the nature of an attachment adapted to be applied to a tractor.

In my copending application for harvesting machine, Serial No. 119,608, filed June 30, 1926, I have disclosed a harvester which in its general construction and the method of attachment to the tractor is similar to the harvester of the instant application.

The present invention has to do more particularly with the butt conveyor and the relation between the same and the stalk conveyor and the sickle. My invention also has to do with the bundle carrier and the releasing means therefor, as well as with the butter and associated mechanism.

One of the main objects of my invention is to provide a harvester comprising a stalk conveyor and a butt conveyor so constructed and related that the stalks as they are cut, are urged away from the sickle toward the stalk conveyor and are transferred to the binder in an expeditious manner. Another object is to provide members associated with the butt conveyor for urging the stalks toward the stalk conveyor, and associated means for actuating such members in a proper manner to prevent interference with transfer of the stalks from the conveyor to the binder table. Another object is to provide means for operating the butter for leveling the butts of the cut stalks, such means being connected to the cutter bar of the sickle so as to be directly driven thereby. A further object is to provide a butt conveyor structure particularly adapted to be disposed adjacent the lower edge of the stalk conveyors, such structure occupying comparatively little space. Further objects and advantages of my invention will appear from the detailed description.

In the drawings:

Figure 1 is a side view of a harvester constructed in accordance with my invention as applied to a tractor of known type;

Figure 3 is a vertical sectional view through the harvester, taken from front to back and looking toward the binder end, parts being omitted;

Figure 4 is a section on an enlarged scale of the butt conveyor structure taken substantially on line 4—4 of Figures 2 and 3;

Figure 5 is a sectional view, on an enlarged scale, taken substantially on line 5—5 of Figure 4;

Figure 6 is a sectional view, on an enlarged scale, taken substantially on line 6—6 of Figure 4;

Figure 7 is a section, on an enlarged scale, taken substantially on line 7—7 of Figure 2;

Figure 8 is a section, taken substantially on line 8—8 of Figure 2, on an enlarged scale;

Figure 9 is a front view, on an enlarged scale, of the butter and associated parts.

Figure 2:
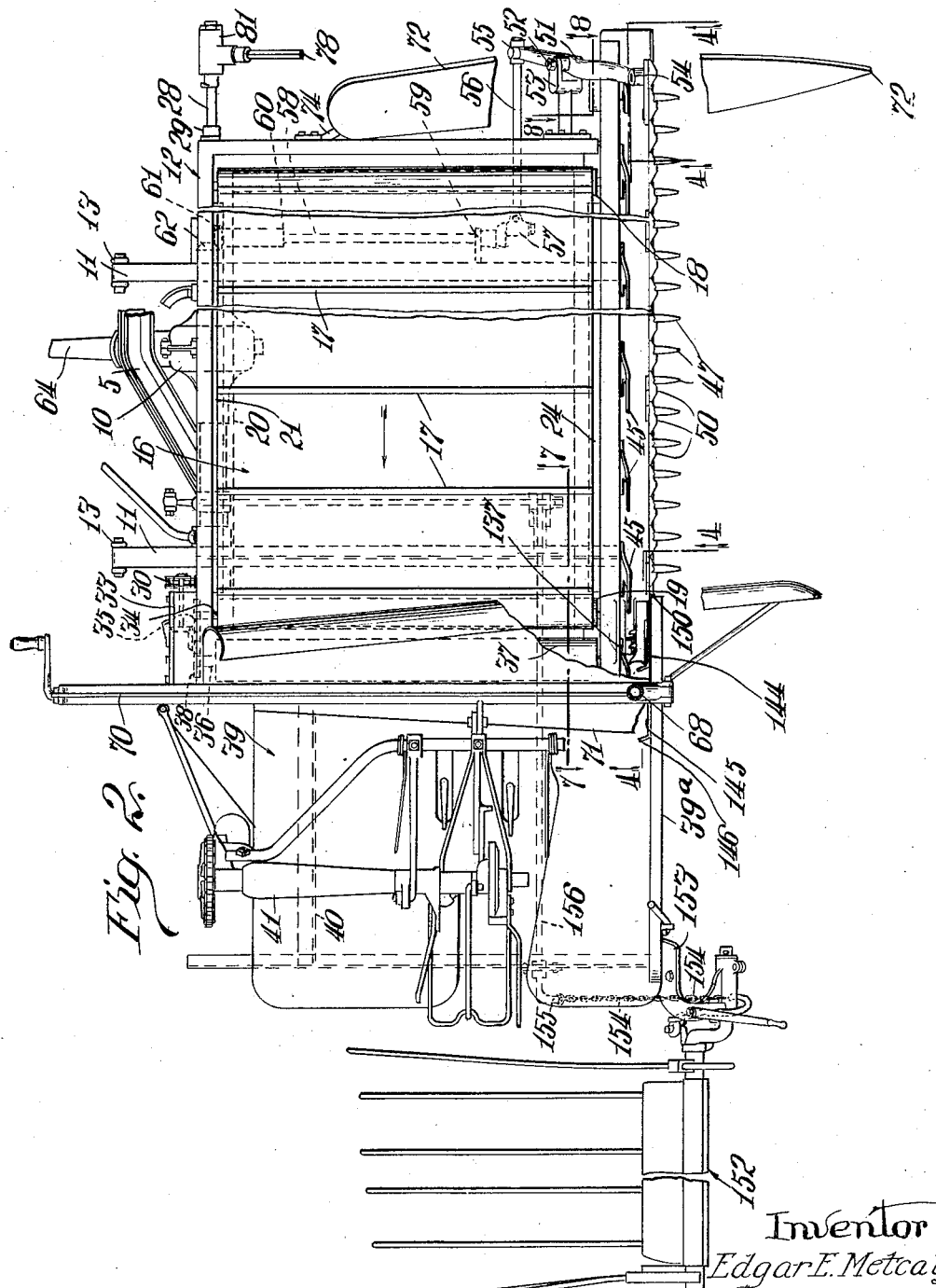
Figure 2 is a plan view of the harvester, parts being broken away.

In Figure 1 I have illustrated a harvester in accordance with my invention as applied to a tractor 1 of known type.

The harvester comprises a supplemental frame 2 which extends rearwardly beneath the tractor and is secured thereto in a suitable manner. This supplemental frame carries an axle structure 3 comprising channels 4 bolted or otherwise suitably secured together. A bow 5, formed of angle strips suitably secured together, is secured to the axle structure 3. Stub axles are pivotally mounted in the ends of axle structure 3, in a known manner, and carry ground wheels 6 rotatably mounted thereon. These stub axles are provided with rearwardly extending arms connected by a cross rod, and one of the stub axles is provided with a steering arm connected by rod 7 to steering arm 8 of the tractor. The steering gear for operating the wheels 6 is of known construction and need not be illustrated nor described in detail.

Bracket arms 9 are bolted to the axle structure 3 and extend upwardly and forwardly therefrom. A shaft housing 10 is suitably secured, at its ends, in the upper ends of the bracket arms 9. This shaft housing projects beyond the bracket arms 9 and receives, at each end, a main supporting bracket 11 which is pivotally mounted upon the shaft housing in a suitable manner. The brackets 11 are secured to and support a main frame 12 of rectangular shape preferably constructed of metal rails or strips of angular cross section.

The brackets 11 are inclined upwardly and rearwardly, the main frame 12 being similarly inclined. The brackets 11 extend rearwardly beyond shaft housing 10 and each bracket has a clevis 13 pivotally secured to its rearward end. A chain 14 is secured to the clevis 13 and any suitable means, such as a windlass, is provided for taking up and letting out the chains thus rocking the brackets 11 so as to vary the inclination of main frame 12. This is advantageous as providing means for adjusting the height of the sickle or cutting mechanism which is carried by the main frame.

The main frame 12 carries a stalk conveyor which comprises a canvass apron 16 having slats 17 secured to its outer face and extending transversely thereof. This apron passes about rollers 18 and 19 disposed transversely of frame 12 and suitably supported therein for rotation. A wooden rail 20 is suitably secured in frame 12 at the top thereof and is provided in its forward face and its rearward face with a rabbet 21 which receives fingers 22 of metal strips 23 suitably secured to the outer face of apron 16. These fingers contact the shoulders provided by the rabbet 21 and prevent downward movement of the apron along the rollers 18 and 19. A wooden rail 24 is suitably secured to frame 12, at the forward or lower side thereof, and coacts with rail 20 to support the apron 16 between rollers 18 and 19.

Apron 16 is preferably provided, on its inner face and at each edge thereof, with a strip 25 of leather or other suitable material which bears upon the rails and protects the canvass of the apron against wear. The upper member of frame 12 is provided, at its rearward edge, with a downwardly extending flange 26 spaced rearwardly of rail 20. A plate 27 is secured to the frame 12 in a suitable manner, as by being formed integrally therewith, and extends forwardly beneath rail 24 in spaced relation thereto. The plate 27 and flange 26 coact with the rails 24 and 20, respectively, to define guide passageways for the lower or rearward run of the apron and prevent undesirable movement or sagging of this run away from the rails.

The apron 16 may be driven in any suitable or preferred manner. In the particular embodiment of my invention illustrated, a shaft 28 is rotatably mounted through shaft housing 10, in a suitable manner, this shaft also extending through suitable bearings 29 at the ends of frame 12. The roller 19 is at the delivery end of the conveyor and is driven from the adjacent end of shaft 28 by means of a sprocket chain 30 which is trained about a sprocket wheel secured on shaft 28, this chain being also trained about a sprocket wheel 31, keyed on a counter shaft 32 rotatably mounted in a gear housing 33 secured in a suitable manner to the top frame member.

The shaft 32 is suitably geared to shaft 34 of roller 19 as indicated by gear 35 in Figure 2. Shaft 32 is also suitably geared to shaft 36 of a delivery roll 37, as indicated by gear 38. The rolls 19 and 37 are driven in the same direction and roll 37 serves to deliver the cut grain to a binder table 39 suitably supported at the delivery end of the frame 12 in a known manner, as by means of a frame 40 of angle iron construction. The binder head 41 and associated mechanism for tying the grain into bundles is mounted on this table and operates in a known manner. The binder may be driven in a suitable or preferred manner known in the art. The binder and the table and associated parts are of known construction and operation and need not be illustrated nor described in detail, it being sufficient to note that the cut grain is delivered by the apron 16 which is driven in the direction indicated by the arrow in Figure 2, and the roll 37, to the binder table where it is tied into bundles.

The apron 16 and the rollers 18 and 19 and associated parts constitute a stalk conveyor for receiving the cut stalks of grain and delivering them to the binder table. For cutting the grain I provide a suitable cutting mechanism or sickle which extends forwardly of the stalk conveyor. This sickle is suitably supported by plate 27 and a metal strip 42 suitably secured to this plate. As will be noted more clearly from Figure 3, plate 27' extends forwardly a short distance parallel with frame 12 and is then bent forwardly and upwardly providing an element 27a, the forward portion of which is bent upwardly and forwardly at a slight angle providing a flange 27b.

Strip 42 is provided, at its forward edge, with a flange 42a which seats upon the upper face of flange 27b. This strip is then bent inwardly or rearwardly at 42b, then downwardly at 42c and again rearwardly at 42d and then downwardly at 42e, the lower edge of portion 42e contacting the upper face of plate 27. An angle strip 43 is disposed above and forwardly of strip 42, the rearward flange or arm of strip 43 being secured to strip 42 by cleats 44 or any other suitable manner. The plate 27 and strips 42 and 43 form an elongated housing or casing within which operates a butt conveyor which comprises fingers 45 which operate through a slot 46 defined by the upper edge of element 42c of strip 42 and the forward edge of the forward flange of strip 43.

Flanges 42a and 27b form a butt table for supporting the butts of cut stalks supported by the stalk conveyor. The sickle or cutting mechanism comprises guards 47 having shanks 48 inclined downwardly and rearwardly and riveted or otherwise suitably secured to the butt shelf formed by flanges 42a and 27d. A cutter bar 49 is mounted for reciprocation upon shanks 48, this bar being confined between the upper edge of flange 42a and shoulders at the upper or forward ends of the shanks. The cutter bar carries cutting members or teeth 50 suitably secured thereto and operating through the guards 47 in a known manner.

Referring more particularly to Figures 3 and 7, it will be noted that the fingers 45 at the forward run of the butt conveyor extend forwardly above the butt shelf and beyond the same. These fingers are inclined transversely of the butt shelf and rearwardly thereof away from the delivery end of the conveyor (Figure 7) and extended forwardly beyond the cutter bar in the plane of frame 12. These fingers are thus disposed to receive the stalks from the sickle as they are cut, and act to direct these stalks rearwardly across the butt table into position upon the stalk conveyor. In this connection, it will be noted that the forward arm of strip 43 is disposed in the plane of the forward run of apron 16 and the butt shelf extends rearwardly somewhat beyond this plane. This particular relation between the sickle and the butt shelf, which is disposed immediately in rear of and closely adjacent the sickle, and the butt conveyor and stalk conveyor, is advantageous as assuring proper delivery of the stalks to the stalk conveyor as they are cut, and proper travel of the same along the butt shelf.

The cutter bar 49 of the sickle may be reciprocated in any suitable manner. For this purpose I have illustrated a lever 51 pivoted intermediate its ends at 52 in a bracket 53 suitably secured to the end of frame 12 remote from the delivery end thereof.

At its forward end lever 51 is suitably connected, at 54, to the cutter bar. At its rearward end the lever is suitably connected, at 55, to a pitman rod 56 connected at 57 to a crank arm of a shaft 58 rotatably mounted in a bracket 59 and a bearing sleeve 60 secured to the adjacent main supporting bracket 11 and strip 20, respectively. A bevel gear 61 is secured on the rearward end of shaft 58 and meshes with a bevel gear 62 secured on shaft 28. The latter shaft is driven from the tractor by means of a shaft 63 which may be connected in a known manner to a suitable power takeoff from the tractor engine. Shaft 63 extends through a shaft housing 64 which is suitably connected to a gear housing 65 extending about shaft 28. Driving connection between shaft 28 and 63, conveniently a gear connection, is disposed within the gear housing 65. This housing may be formed in two sections secured together by bolting, these sections being carried by sections of the shaft housing 10 which is likewise formed in two sections. Any other suitable or preferred drive may be provided between the tractor engine and shaft 28.

A reel 66 is disposed above and in advance of the sickle. This reel is rotatably mounted in bearings carried by sleeve 67 slidable upon uprights 68 and secured in adjustment thereon in a suitable manner as by set screws 69. One of the uprights 68 is carried by a frame 70 of elongated inverted U-shape which extends over the binder table from front to back thereof and is suitably secured to main frame 12.

This frame 70 also carries a shield 71 conveniently formed of sheet metal and rolled so as to define, with the delivery end of the stalks conveyor and the delivery roll a converging passage for directing the cut grain onto the binder table. The other upright 68 is suitably secured to a shield 72 at the other end of the frame 12 and suitably secured thereto by braces 73, 74 and 75, the last of which is preferably adjustable. A bevel gear 76 is secured on the reel shaft and meshes with a bevel pinion 77 slidable on a square shaft 78 which has bearings in a pair of connected and spaced collars 79 and 80, collar 80 being mounted for movement about the axis of the feeder shaft. Shaft 78 has driving connection with shaft 28 by means of suitable gearing disposed in a housing 81 into which shaft 78 extends, this housing having turning movement about shaft 28. The square shaft 78 slides through pinion 77 thus accommodating adjustment of the beater. The construction and operation of the reel, and the driving means therefor, is, in general, known in the art and need not be illustrated nor described in more detail. The reel performs its usual function in urging the grain to be cut rearwardly toward the sickle and the stalk conveyor.

Referring more particularly to Figures 4, 5, and 6, element 42e of strip 42 is provided, adjacent the delivery end of the conveyor, with an opening 82 over which is bolted a mounting plate 83. This plate carries a bearing cup 84 in which is disposed a ball bearing 85 which receives shaft 36 of the grain delivery roll 37. A bearing cup 87 is bolted or otherwise suitably secured to the upper face of plate 83 and carries a ball bearing 88 which supports the lower end of shaft 34 of the conveyor roller 19. A second mounting plate 89 is suitably secured to the inner face of plate 83 in spaced relation thereto. This second plate is provided with a forwardly projecting bearing sleeve 91 in which is mounted a bushing 90 through which extends a stub-shaft 92 which is reduced at its rearward end to provide a bearing gudgeon which bears in a recess in the inner face of plate 83. The forward end of stub shaft 92 is also reduced to provide a bearing gudgeon 93 which has bearing in the terminal portion of an L-shape bracket 94 bolted or otherwise suitably secured to plate 89 at the forward face thereof. Bushing 90 forms an extension of a collar 95 which carries an eccentrically disposed cam member 96. This member is of approximately semi-circular shape and is provided with a central recess 97 extending from its outer edge and adapted for reception of a cooperating member associated with the respective fingers 45.

Stub shaft 92 is driven from shaft 36 in the dierction thereof and at increased speed by means of a spur gear 98 keyed on shaft 36 and meshing with an idler pinion 99 mounted on a stub-shaft 100 which is rotatably mounted in the plates 83 and 89, this pinion 99 meshing with a gear 101 keyed on the rearward end of bushing 91.

A sprocket wheel 102 is keyed on shaft 36 adjacent the forward face of mounting plate 89. It will be noted that this sprocket wheel is disposed between the mounting plate and the rotating cam 96 which thus operates forwardly of the sprocket wheel.

A housing 103 is mounted upon the rearward face of element 42e of strip 42 adjacent the end thereof remote from the delivery end of the conveyor. A mounting plate 104 is disposed on the forward face of element 42e in suitable alignment with housing 103, this plate and the housing being suitably secured together and to element 42e, as by means of bolts or equivalent means. A stub-shaft 105 is mounted in ball bearings 106 carried by housing 103 and plate 104. This shaft projects forwardly beyond plate 104 and has a sprocket wheel 107 secured on its forward end in alignment with sprocket wheel 102. A sprocket chain 108 is trained about the sprocket wheels and constitutes the endless flexible element of the butt conveyor. The fingers 45 are suitably secured to the chain 108 for turning movement relative thereto.

Each of these fingers comprises a base portion 45a of approximately triangular shape from the vertex of which extends the finger proper. This finger is offset laterally, at 45b, so that the finger is disposed forwardly of the plane of base 45a a proper distance to clear bracket 94. The base 45a is pivotally secured, at its forward end, to chain 108 by a pivot pin 109. This pin passes through a spacer 110 which serves to space the finger in its entirety forwardly of chain 108. For convenience in description, I refer to the end of base 45a of the finger which is directed towards the delivery end of the conveyor as the forward end, and the other end of the base as the rearward end. A roller 111 is mounted upon a stud 112 provided at the rearward end of base 45a of the finger and projecting therefrom in the direction of chain 108.

Element 42b of strip 42 is provided, adjacent the delivery end of the conveyor, with a finger receiving and guide element 113. This element may conveniently be formed integrally with element 42b and is preferably open at its forward side at 114. The guide element 113 is inclined downwardly and inwardly of the conveyor casing away from the delivery end thereof, and is provided with an opening 115 at its forward end, that is, at its end toward the delivery end of the conveyor, for entry of the fingers 45.

As will be noted more clearly from Figure 3, the lateral offset of the fingers above referred to, in addition to assuring that the fingers will clear bracket 94, also serves to dispose the terminal portions of the fingers in the plane of the guide element 113. To further assist in directing the fingers into the guide element, element or wall 42c of strip 42 is extended downwardly and bent to provide a deflecting member 116 disposed forwardly of cam 96 and at a slight upward and forward inclination so as to impart slight forward rocking movement to the fingers as they enter the guide element 113, this movement being permitted by the flexibility of chain 108.

A guide member of approximately Y-shape, indicated in its entirety by 117, is disposed in the conveyor housing or casing adjacent the rearward end thereof. An oscillating guide cam 119 is disposed at the crotch of this guide member and coacts with rollers 111 to control the movement of fingers 45. The cam 119 is carried at the forward end of a shaft 120 rotatably mounted through a bushing 121 disposed in a sleeve 122 carried by plate 104. Nuts 123 are screwed upon the rearward end of shaft 120 and an expansion coil spring 124 is mounted about this shaft and confined between a washer 125 and a sleeve 126 of housing 103. Rearward movement of the shaft is limited by a flange 127 at the inner end thereof which operates in a suitable recess in guide member 117.

The cam 119 is integrally connected to shaft 120 and extends inwardly beyond flange 127 into the plane of the guide surfaces of guide member 117.

An arm 128 is secured on shaft 120 and carries a roller 129 which operates in channel 130 of a box cam 131 keyed on shaft 105. Channel 130 is of approximately elliptical shape but it is flattened at one side at 131a. During operation of the butt conveyor the guide cam 119 is oscillated by means of arm 128 and associated parts in synchronism with the operation of the elevator.

As will be noted more clearly from Figures 3 and 4, wooden guide strips 132 and 133 are disposed in the upper and lower compartment, respectively, of the butt conveyor casing. Strip 132 terminates, at its forward end, short of the rotating cam 96 and has its rearward end adjacent the forward end of guide member 117, as in Figure 4. Strip 133 is disposed against the under face of element 42d of the metal strip 42 and has its under face provided with a rabbet providing a guide groove 134 for reception of rollers 111 of the fingers 45. The forward end of guide strip 133 is disposed somewhat to the rear of bracket 94 and the rearward end of this strip is rounded and forms a continuation of the rounded rearward end of strip 132.

During the operation of the butt conveyor, as the fingers 45 travel forwardly, that is, towards the delivery end of the conveyor, they are held in operative relation to the conveyor chain so as to project forwardly above the butt shelf as in Figures 3 and 7, by the rollers 111 which coact with strip 132 and the forward flange of member 43 to hold the fingers against turning movement about the pivot pins 109. As a finger 45 passes forwardly beyond the guide strip 132 and the roller 111 passes out of contact with this strip, the finger tends to turn about pivot 109 in the opposite direction to its travel. At this time, the rotating cam 96 is so positioned as to receive roller 111 in recess 97. As this cam is driven at higher speed than sprocket 102, the cam acts to rock the finger reversely to its direction of travel about the delivery end of the conveyor. This results in the finger being turned or rocked from the full line position A of Figure 4 into the successive dotted line positions B, C, D and E. This reverse movement of the finger is of importance as releasing the stalks between the finger and the conveyor in such manner as to eliminate all possibility of pinching or clamping of the stalks by the finger such as would tend to interfere with proper delivery thereof to the binder table. This gradual reverse movement of the finger also prevents interference with delivery of the grain in rear of the finger to the delivery roll and thence to the table.

Shortly after the finger assumes the position E of Figure 4, the cam 96 passes out of contact with roller 111 and the finger starts upon its return travel through the lower compartment of the casing. The finger enters guide element 113 through opening 115 and as it travels rearwardly it is tilted in the reverse direction by contact of the forward end of the finger with the inclined top wall of the guide element. As the finger enters the guide element it is in position F of Figure 4 and as it leaves this guide element it has been tilted into the position G, with the roller 111 in contact with surface 135 of guide strip 133 and the finger in contact with the under face of element 42b. As the finger approaches the guide member 117 roller 111 passes between guide cam 119 and the lower guide surface of member 117 this surface and the cam defining a passage for reception of the roller. As the finger reaches this position, it is brought into alignment with a slot 136 through element 42b. This permits the finger to move upwardly so that roller 111 can rest upon the lower guide surface of member 117. During travel of the finger about sprocket wheel 110, roller 111 moves rearwardly into the stem portion of guide member 117 as indicated in Figure 4. Immediately thereafter roller 129 of arm 128 enters the straight or flat portion 131a of cam channel 130. This rocks the cam 119 into the dotted line position of Figure 4.

In the continued travel of the finger, which has now passed beyond the center of sprocket 110 and is being moved forwardly, roller 111 travels upon the upper face of cam 119 and this cam is rocked so as to be returned to its full line position. The finger then passes into the upper compartment of the conveyor casing and is held in operative position therein, in the manner previously described. In this manner the fingers are successively retracted and projected so as to be moved out of and into operative position. A further advantage of rocking the fingers reversely to their direction of travel about the delivery end of the conveyor is that the fingers at the lower or rearward run of this conveyor are directed similarly to the fingers at the upper run thereof. This provides a conveyor structure which is compact and occupies a minimum of space, such structure being particularly well adapted for use adjacent the lower edge of the stalk conveyor.

It is desirable to prevent pulling of the grain into the guide member 113 with the fingers. I preferably provide member 43 of the butt conveyor casing with a flange 137 at the forward edge of the upper wall thereof. This flange is inclined forwardly toward the delivery end of the conveyor and is disposed above the guide element 113. The flange 137 acts to deflect the stalks of the cut grain upwardly and forwardly away from the guide element so as to prevent, to a large extent, pulling of the grain into the guide element with the fingers 45.

I find that under certain unfavorable conditions, a small amount of grain may be pulled into the guide member 113 with the fingers. To prevent passage of this grain into the butt elevator casing, I preferably provide means for removing this grain and feeding it forwardly toward the binder table. For this purpose I provide a plate 138 of channel cross section the upper rearward wall of which is disposed adjacent the lower open side of guide member 113. This plate 138 is provided with a plurality of teeth 139, 140, 141, and 142, which increase in length toward the delivery end of the conveyor. Tooth 139 extends through the opening 114 through the forward side of guide member 113, tooth 140 extends above the guide member, tooth 141 extends across the entrance opening 115 of this guide member and tooth 142 is disposed an appreciable distance in advance of the guide member. The plate 138 is reciprocated and the teeth of this plate serve to remove from the guide member any straw or grain which may enter the same and to feed this grain forwardly to the binder table.

In order to facilitate tying of the grain into bundles, the cut or butt ends of the grain stalks should be properly evened or leveled up. For this purpose I provide what is commonly termed a butter. A plate 143 is slidably mounted on the upwardly and forwardly extending portion 39a of the binder table 39. This plate has suitably secured thereto two plates 144 and 145, the forward portions of which are angularly disposed and are serrated to provide teeth 146 which are inclined upwardly and forwardly towards the binder table. Plate 138 is provided with an extension 147 and with an arm 148 extending from such extension substantially at right angles thereto. The extension 147 is suitably secured, as by bolts 149, to an extension 150 of the cutter bar 49. This extension may be formed as an integral part of the cutter bar, or as a separate element suitably connected thereto, as desired. Arm 148 may be suitably secured, as by a bolt 151, to plate 143 and 144. In this manner, the plate 138 is secured to plate 143, and the latter plate is connected to the cutter bar for reciprication therewith. It will thus be seen that the butter and the plate 138 are both reciprocated from the cutter bar of the sickle thus providing efficient and extremely simple means for operating the butter and associated parts. The cut grain is delivered from the conveyor to the butter which acts in a known manner to level the butts of the cut stalks, and then passes to the binding table where it is tied into bundles in a known manner.

A bundle carrier 152 is mounted at the discharge end of the binder table on a bracket 153 suitably secured to the table. This bundle carrier has associated therewith trip mechanism to which is attached a trip chain 154. The construction and operation of the bundle carrier, and the supporting and trip means therefor are well known in the art. Chain 154 is connected to arm 155 of a shaft 156 rockably mounted in suitable bearings on the frame 40 and the adjacent main supporting bracket 11. An arm 157 is secured on the other end of shaft 156 and is connected by a link 158 to one arm 159 of a bell crank lever 160, which is rockably mounted on the shaft housing 10 for turning movement about the same. The other arm 161 of the bell crank is connected by a link 162 to arm 163 of a crank shaft 164 rockably mounted in a bracket 165 carried by an upright 166, which is suitably secured to axle structure 4 and bow 5. Crank shaft 163 is provided with an arm 167 which is directed substantially oppositely to arm 163. Arm 167 is connected by a rod 168 to a pedal 169 (Fig. 1) conveniently pivoted on fender 170 of the tractor, by means of a bracket 171. This pedal is disposed so as to be conveniently operated by the operator of the tractor so that by rocking the pedal in a counter-clockwise direction, as considered in Figure 1, the bundle carrier is tripped. By reference to Figure 3, it will be noted that trip shaft 156 forms, with link 158 and arm 157, and the bell crank lever 160 and bracket 11, a figure which closely approximates a parallelogram.

Since the bell crank 160 rocks on the axis of shaft 28 and the main frame 12 is adjustable about this axis, the disposition of the shaft 156 and associated parts in the manner illustrated and described permits relatively great movement of the main frame 12 in the adjustment thereof without materially varying the relation of the trip shaft 156 and associated parts. This is advantageous as assuring that the trip mechanism is operable in all positions of main frame 12 while also providing an extremely simple and highly efficient trip operating means.

What I claim is:

1. In a harvesting machine, an upwardly and rearwardly inclined stalk conveyor, a sickle disposed in proximity to the lower edge of the conveyor, a butt shelf in rear of and adjacent the sickle and disposed to support the butts of cut stalks supported by the conveyor, and a butt conveyor operating between the stalk conveyor and the shelf and comprising stalk engaging fingers extending forwardly therefrom and inclined transversely of the butt shelf and rearwardly thereof in the direction opposite to their direction of travel, said fingers extending forwardly beyond the shelf and above the sickle for engaging the stalks as they are cut and urging them rearwarly toward the stalk conveyor.

2. In a harvesting machine, an upwardly and rearwardly inclined endless stalk conveyor, a butt conveyor supporting and guide structure at the lower edge of the stalk conveyor, a sickle disposed forwardly of said structure, a butt shelf in rear of and adjacent the sickle and disposed to support the butts of stalks supported by the stalk conveyor, an endless butt conveyor operating in the butt conveyor supporting and guide structure and comprising stalk engaging fingers, the fingers of the forward run of the conveyor extending forwardly above the shelf and at an inclination transversely thereof and rearwardly in a direction opposite to their direction of travel, said fingers being mounted for rocking movement, and means for rocking the fingers opposite to their direction of travel as they approach the delivery end of the butt conveyor.

3. In a harvesting machine, an upwardly and rearwardly inclined endless stalk conveyor, a butt conveyor casing at the lower edge of the stalk conveyor, a sickle disposed forwardly of the casing, a butt shelf adjacent and in rear of the sickle, an endless butt conveyor operating in the casing, said casing comprising a forward compartment and a rearward compartment, the butt conveyor comprising a flexible element and stalk engaging fingers pivotally mounted thereon, means for disposing the fingers of the forward run of the butt conveyor to project forwardly above the shelf, and means for turning said fingers into position to enter the lower compartment of said casing, the fingers at the lower run of the butt conveyor being directed forwardly thereof.

4. In a harvesting machine, an upwardly and rearwardly inclined endless stalk conveyor, a sickle in proximity to and forward of the conveyor, a butt shelf adjacent and in rear of the sickle and disposed to support the butts of cut stalks supported by the conveyor, a butt conveyor between the shelf and the stalk conveyor and comprising an endless flexible element having a forward run and a rearward run, stalk engaging fingers mounted on said element for relative movement, means for moving the fingers at the forward run of the butt conveyor into position to extend forwardly therefrom above the shelf and for holding them in such position during travel thereof toward the delivery end of the butt conveyor, and means moving said fingers into position to extend in the same direction on the rearward run of the butt conveyor as they reverse their direction of travel in passing about the delivery end of said butt conveyor.

5. In a harvesting machine, an upwardly and rearwardly inclined endless stalk conveyor, a sickle in proximity to and forward of the conveyor, a butt shelf adjacent and in rear of the sickle and disposed to support the butts of cut stalks supported by the conveyor, a butt conveyor between the shelf and the stalk conveyor and comprising an endless flexible element having a forward run and a rearward run, stalk engaging fingers mounted on said element for relative movement, means for moving the fingers at the forward run of the butt conveyor into position to extend forwardly therefrom above the shelf and for holding them in such position during travel thereof toward the delivery end of the butt conveyor, and means moving said fingers into position to extend forwardly from the rearward run of the butt conveyor as they reverse their direction of travel in passing about the delivery end of said butt conveyor, the forward run of the butt conveyor being disposed above the rearward run thereof.

6. In a harvesting machine, an upwardly and rearwardly inclined endless stalk conveyor, a sickle in proximity to and forward of the lower edge of said conveyor, a butt shelf adjacent and in rear of the sickle and disposed to support the butts of cut stalks supported by the conveyor, a casing at the lower edge of the conveyor, an endless butt conveyor comprising a flexible member having a forward run and a rearward run operating in the casing, stalk engaging fingers pivoted to said element for relative turning movement, the casing having a slot in its forward wall accommodating said fingers, means for holding the fingers at the forward run of the butt conveyor in position to extending forward therefrom through said slot and above the shelf, such fingers being inclined transversely of the shelf and rearwardly thereof oppositely to their direction of travel to urge the cut stalks rearwardly toward the stalk conveyor, means for turning the fingers oppositely to their direction of travel as they pass about the delivery end of the conveyor, the casing having an opening for entry of the fingers for return travel thereof, and means for deflecting the stalks away from said opening.

7. In a harvesting machine, an upwardly and rearwardly inclined endless stalk conveyor, a sickle in proximity to and forward of the lower edge of said conveyor, a butt shelf adjacent and in rear of the sickle and disposed to support the butts of cut stalks supported by the conveyor, a casing at the lower edge of the conveyor, an endless butt conveyor comprising a flexible member having a forward run and a rearward run operating in the casing, stalk engaging fingers pivoted to said element for relative turning movement, the casing having a slot in its forward wall accommodating said fingers, means for holding the fingers at the forward run of the butt conveyor in position extending forward therefrom through said slot and above the shelf, such fingers being inclined transversely of the shelf and rearwardly thereof oppositely to their direction of travel to urge the cut stalks rearwardly toward the stalk conveyor, means for turning the fingers oppositely to their direction of travel as they pass about the delivery end of the conveyor, the casing having a guide element disposed to contact the fingers and tilt them toward the delivery end of the conveyor as they enter the casing on their return travel, said guide element having an opening for entrance of the fingers and an opening through its forward wall, means for deflecting the stalks away from said entrance opening, and reciprocating means connected to the sickle mechanism and disposed to engage stalks within and adjacent said guide element and feed them toward the delivery end of the butt conveyor.

8. In a harvesting machine, an upwardly and rearward inclined endless stalk conveyor, a sickle in proximity to and forward of the lower edge of the conveyor, a butt shelf adjacent and in rear of the sickle and disposed to support the butts of cut stalks supported by the conveyor, a butt conveyor operating between the shelf and the stalk conveyor and comprising stalk engaging fingers projecting forwardly above the shelf, a binder table at the delivery end of the conveyors, a butter disposed to receive the butts of stalks delivered from the conveyors and reciprocally mounted upon the table, the sickle comprising a reciprocating member, and an operating connection between said member and the butter.

9. In a harvesting machine, a sickle, a butt shelf adjacent and in rear of the sickle, conveying mechanism disposed to receive the cut stalks and convey them along the shelf in butt contact therewith, a binder table at the delivery end of said mechanism, a butter reciprocably mounted at the delivery end of the shelf, the sickle comprising a reciprocating member, and an operating connection between said member and the butter.

10. In a harvesting machine, a sickle, a butt shelf adjacent and in rear of the sickle, conveying mechanism disposed to receive the cut stalks and convey them along the shelf in butt contact therewith, said mechanism comprising a casing and an endless butt conveyor operating therein and having stalk engaging fingers, the fingers at the forward run of the butt conveyor extending forwardly above the shelf and the casing having a guide element coacting with the fingers in the return travel thereof with the rearward run of the butt conveyor, said guide element being open at its forward side, a binder table at the delivery end of the conveying mechanism, a butter reciprocably mounted at the delivery end of the shelf, a member carried by the butter and having elements disposed in proximity to the guide element and to engage stalks within and adjacent said member and feed them toward the binder table, the sickle comprising a reciprocating member and an operating connection between said member and the butter.

11. In a conveyor structure for harvesting machines, a casing comprising an upper compartment and a lower compartment, a conveyor comprising an endless flexible element having an upper run and a lower run operating in said upper and lower compartments, respectively, fingers pivoted to said element, the upper compartment having a slot accommodating the fingers during travel thereof toward the delivery end of the conveyor, and means for turning the fingers about their pivots in a direction opposite to their direction of travel as they approach and pass around the delivery end of the conveyor, the fingers at the lower run of the conveyor extending in the same general direction as the fingers at the upper run thereof.

12. In a conveyor structure for harvesting machines, a casing comprising an upper compartment and a lower compartment, a conveyor comprising an endless flexible element having an upper run and a lower run operating in said upper and lower compartments, respectively, fingers pivoted to said element, the upper compartment having a slot accommodating the fingers during travel thereof toward the delivery end of the conveyor, means for turning the fingers about their pivots in a direction opposite to their direction of travel as they approach and pass around the delivery end of the conveyor, means for tilting the fingers in a reverse direction during the first part of their reverse travel, the fingers at the lower run of the conveyor extending in the same general direction as the fingers at the upper run thereof, means for returning the fingers to operative position as they pass from the lower compartment to the upper compartment, and means for maintaining the fingers in projected operative position during travel thereof through the upper compartment of said casing.

13. In a conveyor structure for harvesting machines, a casing comprising an upper compartment and a lower compartment, sprocket wheels mounted within the casing adjacent the ends thereof, a sprocket chain trained about the wheels and comprising an upper run and a lower run operating in the upper and lower compartments, respectively, fingers pivoted to the upper run of the conveyor, and means cooperating with the fingers for tilting the latter about their pivots reversely to their direction of travel as they pass about the delivery end of the conveyor.

14. In a conveyor structure for harvesting machines, a casing comprising an upper compartment and a lower compartment extending laterally beyond one side of the upper compartment, a conveyor comprising an endless flexible element having upper and lower runs operating in the upper and lower compartments, respectively, fingers pivoted to said element, and means for turning the fingers about their pivots as they enter the lower compartment of the casing so as to dispose the fingers at the lower run of the conveyor in the same general direction as the fingers at the upper run thereof, the fingers and the upper compartment having cooperating means for maintaining the fingers at the upper run of the conveyor in operative position projecting forwardly from the casing.

15. In a conveyor structure for harvesting machines, a casing comprising an upper compartment and a lower compartment extending laterally beyond one side of the upper compartment, a conveyor comprising an endless flexible element having upper and lower runs operating in the upper and lower compartments, respectively, the lower compartment having at the top thereof a guide element opening toward the delivery end of the conveyor and inclined downwardly and inwardly thereof away from said delivery end, fingers pivotally mounted on said flexible element and having their terminal portions laterally offset and disposed substantially in the plane of the guide element, means for turning the fingers on their pivots reversely to their direction of travel as they pass about the delivery end of the conveyor, said guide element being disposed to contact the fingers and tilt them into position to enter the lower compartment in their initial return travel with the lower run of the conveyor, and means for tilting said fingers in a reverse direction and returning them to operative position as they pass from the lower compartment to the upper compartment of the casing, said fingers and the upper compartment having cooperating means for maintaining the fingers in operative position during travel thereof to the delivery end of the conveyor.

16. In a conveyor structure for harvesting machines, a casing, a conveyor comprising an endless flexible element operating in the casing and having a forward run and a rearward run, fingers pivotally mounted on said element, the casing having an opening for entry of the fingers in the return travel thereof and the fingers having their terminal portions laterally offset into substantially the plane of such opening, means for tilting the fingers about their pivots as they pass about the delivery end of the conveyor and enter the casing in their return travel and for disposing the fingers at the rearward run of the conveyor in the same general direction as the fingers at the forward run thereof, the fingers at the forward run projecting forwardly from the conveyor, means for returning the fingers to operating relation to the conveyor as they pass from the rearward run to the forward run thereof, and means for holding the fingers at the forward run of the conveyor against turning movement.

17. In a conveyor structure for harvesting machines, a casing, a drive sprocket adjacent the delivery end of the casing, a driven sprocket adjacent the other end of the casing, a chain trained about the sprockets and having a forward run and a rearward run, fingers each comprising an elongated base and a laterally offset body portion, the base portion being pivoted at its forward end to the chain, a rotating cam adjacent and driven from the drive sprocket at increased speed, the base portion of the finger being provided adjacent its rearward end with an element projecting into the plane of the cam and said cam coacting with said element to turn the finger on its pivot in the reverse direction to its travel as it passes about the delivery end of the conveyor thus disposing the fingers at the rearward run of the conveyor in the same general direction as the fingers at the forward run thereof, means for maintaining the fingers in such position during return travel thereof through the casing, a guide member in rear of the driven sprocket, a guide cam, driving connections between the guide cam and the driven sprocket for imparting oscillatory motion to the guide cam, said guide cam coacting with the guide member for returning the fingers to their operating relation to the chain as they pass from the rearward run to the forward run thereof, and guide means for the upper run of the conveyor and coacting with said elements of the fingers to prevent reverse turning movement thereof on their pivots.

18. In combination in a harvesting machine, a main frame mounted for adjustment on an axis, harvesting mechanism carried by the frame and comprising a device to be tripped, a trip shaft having operating connections with said device, an arm secured to said shaft, a second arm mounted for turning movement coaxially with the frame, a link connecting the arms and defining therewith and with the frame an approximate parallelogram, and operating means connected to said second arm.

19. In combination in a harvesting machine, a main frame mounted for adjustment about an axis, supporting means defining said axis, harvesting mechanism carried by the frame and including a device to be tripped, means for tripping said device including a member mounted for movement about said axis, and operating means connected with said member.

20. In combination in a harvesting machine, a main frame mounted for adjustment about an axis, supporting means defining said axis, adjusting mechanism on said supporting means for effecting said adjustment, harvesting mechanism carried by the frame and including a device to be tripped, means for tripping said device including a member mounted for movement about said axis, and operating means connected with said member.

21. A harvester of the class described comprising the combination of a wheeled supporting means, and grain cutting and conveying devices carried by said supporting means and including a sickle, a butt shelf extending downwardly and rearwardly from the plane of the sickle, an inclined conveyor adapted to receive the cut stalks of grain in an inclined position with their butt ends resting on said shelf, and a butt conveyor operating above said shelf and said sickle and including stalk engaging fingers.

22. A harvester of the class described comprising the combination of a wheeled supporting means, and grain cutting and conveying devices carried by said supporting means and including a sickle, a butt shelf extending downwardly and rearwardly from the plane of the sickle, an endless butt conveyor operating above said sickle and including stalk engaging fingers, and a casing associated with the shelf and adapted to enclose the return run of the conveyor.

23. A harvester of the class described comprising the combination of a wheeled supporting means, and grain cutting and conveying devices carried by said supporting means and including a sickle, a butt shelf extending downwardly and rearwardly from the plane of the sickle, an inclined conveyor adapted to receive the cut stalks of grain in an inclined position with their butt ends resting on said shelf, an endless butt conveyor operating above said shelf and said sickle and including stalk engaging fingers, means acting as a casing to enclose the return run of said endless conveyor, and means for tilting the fingers to bring them to a position to enter said casing with the return run of the conveyor.

In witness whereof, I hereunto subscribe my name this 15 day of June, 1929.

EDGAR E. METCALF.